United States Patent [19]

Ferretti

[11] Patent Number: 5,371,194

[45] Date of Patent: Dec. 6, 1994

[54] BIOMASS DERIVED THERMOSETTING RESIN

[76] Inventor: Arthur Ferretti, 729 Water St., Silverton, Oreg. 97381

[21] Appl. No.: 964,484

[22] Filed: Oct. 21, 1992

Related U.S. Application Data

[63] Continuation of Ser. No. 776,847, Oct. 15, 1991, abandoned, which is a continuation-in-part of Ser. No. 290,983, Dec. 28, 1988, abandoned.

[51] Int. Cl.$^5$ .......................... C07K 3/08; C08H 1/00; C08H 5/04; C08J 9/26
[52] U.S. Cl. ........................ 530/378; 44/554; 71/64.11; 427/208.2; 427/395; 427/411; 521/63; 521/13; 521/47; 527/103; 527/200; 527/312; 527/400; 530/409; 530/411; 530/500
[58] Field of Search ............... 44/554; 427/411, 208.2, 427/395; 162/174; 530/360, 365, 378, 395, 409, 411, 500, 832, 833; 521/63; 524/13, 47, 59; 527/101, 103, 200, 312, 400; 71/64.05, 64.11, 64.13

[56] References Cited

U.S. PATENT DOCUMENTS

| | | | |
|---|---|---|---|
| 1,924,457 | 8/1933 | Roserwald | 44/554 |
| 3,062,760 | 11/1962 | Dermody et al. | 521/63 |
| 3,395,033 | 7/1968 | Remer | 527/200 |
| 3,567,811 | 3/1971 | Humphrey | 264/63 |
| 4,524,164 | 6/1985 | Viswanathan et al. | 524/14 |
| 4,692,478 | 9/1987 | Viswanathan et al. | 527/300 |

FOREIGN PATENT DOCUMENTS

| | | | |
|---|---|---|---|
| 143258 | 4/1921 | United Kingdom | 162/174 |
| 9007541 | 7/1990 | WIPO | |

OTHER PUBLICATIONS

Ferretti et al., "Nonenzymatic Browning in a Lactose-Casein Model System", *J. Ag. Food Chem.* 18(1), Jan.–Feb. 1970, pp. 13–18.

Ferretti et al., "The Lactose-Casein (Maillard) Browning System ...", *J. Ag. Food Chem.*, 19(2), 1971, pp. 245–249.

Ferretti et al., "Utilization of Whey/Lactose as an Industrial Binder," *J. Ag. Food Chem.* 27(4), 1979, pp. 687–690.

Viswanathan et al., "Identification of Thermosetting Resins ...", *Ind. Chem. Prod. Res. Dev.* 24, 1985, pp. 176–177.

*Primary Examiner*—Jeffrey E. Russel
*Attorney, Agent, or Firm*—George W. Wasson

[57] ABSTRACT

A multi-purpose resin synthesized from a mixture of a protein and a carbohydrate by ammoniation instead of hydrolysis is described. Any primary product of photosynthesis (glucose, starch or lignocellulose) is qualified for use as the carbohydrate component of the resin, which is an expedient, low-cost and benign substitute for conventional thermosetting resins in the manufacture of numerous industrial products.

20 Claims, No Drawings

BIOMASS DERIVED THERMOSETTING RESIN

This application is a Continuation of Ser. No. 776,847, filed Oct. 15, 1991, now abandoned, which was a Continuation-in-part of Ser. No. 290,983, filed Dec. 28, 1988, now abandoned.

FIELD OF THE INVENTION

This invention relates to a thermosetting resin and a method of creating such resin without hydrolysis from the sugars, starches and lignocellulosics that comprise the three carbohydrate products of photosynthesis.

BACKGROUND OF THE INVENTION

The resin precursors of virtually all synthetic plastics are formulated from ever-more-costly crude-oil derivatives; accordingly, even the resins of mediocre quality used in marginal-value products have become excessively expensive. When alternatives to petroleum are evaluated in terms of cost, chemical potential and occurrence, biomass emerges as the most, if not only, feasible substitute. Although nominally priced, raw biomass almost invariably must undergo lengthy and rather costly hydrolytic processing before useful monomers are realized. The unfavorable economics that accompany these procedures have discouraged development of biomass while fostering use of fossil fuels as the near-exclusive raw material for conventional plastics.

Because the thermosetting resin disclosed herein is synthesized from biomass without an intervening hydrolysis step, it has intrinsic energy, cost and environmental advantages over the resins used to form many conventional thermosetting plastics.

SUMMARY OF THE INVENTION

To improve the cohesiveness and durability of coal-fines pellets made with a binder of whey permeate (a waste byproduct of cheese-whey refinement), high-sulfur fines were ammoniated to pH 10+ with aqueous ammonia prior to the addition of an aqueous dispersion of permeate. Ammoniation was expected to reduce the deterioration of the permeate resulting from contact with acid leached from the coal's pyritic inclusions. It was successful to the extent that fuel pellets made with permeate from ammoniated coal-fines were quite strong and hard after being dried at about 90° C.; it was unsuccessful in view of the pellets' rapid disintegration when immersed in water.

Unexpectedly, however, a remedy for this loss of integrity was discovered; spontaneous polymerization of the binder matrix was effected and coral-hard, waterproof pellets were produced when the drying temperature was raised to above 200° C.

The mechanics of this phenomenon were resolved by transposing ammoniation from a fines-pretreatment to a binder-preparation step and by substituting white sand for coal-fines. Transposition yielded a time-stable mixture that was thermosettable to a water-proof polymer, thereby confirming ammoniated permeate as an intermediate that can be formed either alone or during admixture with a substrate. The substitution of said revealed that coal was not chemically involved in the formation of this resin and that, as the reaction proceeded, the color of the sand's binder-matrix unexpectedly changed from clear to very dark brown-black.

When heated alone, ammoniated permeate provided additional process data: specimens turned jet black from brown by 150° C.; the minimum temperature needed for insolubility was found to be about 175° C.; and no decomposition occurred between 200 and 300° C. the range within which it is usually complete. Similar specimens became embrittled and lost weight as the temperature was raised above 200° C., confirming thereby the realization of cross-linking condensation reactions. Other cheese and milk byproducts that also contain both lactose and whey protein, including whey, whey protein concentrate, delactosed whey permeate, and even skim milk, produce virtually identical results: each yields a black thermoset polymer when ammoniated and intensely heated.

Ammoniation as used herein, means to treat with ammonia to the extend a pH above neutral, i.e., alkalinity, is achieved. Individually, or in a mixture with a protein-containing material, carbohydrate-containing materials, which have a moisture content ranging from nominally dry (0.2 to 10% water by weight) to over 99%, are readily ammoniated with aqueous, gaseous or anhydrous liquid ammonia. Visible changes in reactants and their mixtures often accompany ammoniation, e.g., beige corn flour turns bright yellow, and aqueous dispersions manifest irreversible changes in viscosity and solubility.

Selective recombination of the primary materials comprising whey permeate - lactose and whey protein - with ammonia, affirmed that a thermoset polymer will not be formed if any one of these reactants is absent. From this observation, and tests showing the inability of common alkaline reagents, e.g., sodium and potassium hydroxide, to produce similar results, it was concluded that an ammonia-specific reaction-pathway for creating a stable, thermosetting resin from a mixture of lactose and whey protein had been isolated. Despite the many dissimilarities between products of a typical Maillard reaction and the polymeric materials yielded by this new reaction-pathway, the latter are termed Maillard-type polymers to identify them generically with their origin, which is now recognized in the art.

The versatility of this new pathway, particularly regarding low-cost carbohydrates and protein forms not usually identified as routine Maillard reactants, was explored and further defined by evaluating test mixtures of such anomalous reactants. These mixtures replicated the carbohydrate:protein ratio found in whey permeate, which typically ranges from about 20 to 30:1.

Protein-rich soybean-derived flours, such as soy protein isolate, protein concentrate and ordinary defatted soy flour, which contain about 93, 67 and 52% protein, respectively, were all found to satisfy an important objective: the replacement of whey protein concentrate (a costly, hygroscopic component) with a cheaper and more manageable substance. Of these, ordinary soy flour is the most abundant and cost-effective.

A thermoset polymer resulted from test mixtures containing soy flour and each of the following carbohydrates: the reducing sugars, glucose and lactose; the non-reducing sugar, sucrose; cellulose powder and wood flour; and farinaceous, starch-rich, flours. The criterion for carbohydrate utility in this reaction is the presence of glucose or a glucoside, with a glucoside defined as a di- or poly-saccharide that would, if hydrolyzed, yield glucose. Because glucoside-containing materials are pervasive, universally available and, except for glucose-yield, virtually interchangeable, this criterion embraces a myriad of potential raw materials.

The color developed by reaction products as they polymerize separates the carbohydrate feedstocks into 2 conspicuous groups; polymers formed from farinaceous and cellulosic raw materials yield an insoluble beige polymer at about 180° C.; mixtures composed of either reducing or non-reducing sugars turn black before reaching this temperature, or achieving insolubility.

Monomeric glucose is not generally available for industrial use, however, lignosulfonate byproducts of sulfite wood-pulping, as well as lignocellulosic hydrolysates, contain substantial quantities of hexose sugars (usually reported as glucose) and are useful as the carbohydrate component of this resin. These wood-derived substances are of little value for this purpose, however, if they are first subjected to ethanol fermentation or other hexose reduction procedure.

Proteinaceous materials useful in this new resin, in addition to the aforementioned soy flours and milk by-products include, to the extent they contain protein, flours made from other varieties of pulse (leguminous beans and seeds, such as sunflower and rape-seeds). Used herein, the term protein includes not only the polyamide, protein, but urea, the amide that is the chief nitrogen-containing product of protein metabolism. In the presence of a base, urea hydrolyzes to ammonia and $CO_3$.

Mixed with glucose, or a glucan of sugar or starch, urea also behaves much like the specified dairy and vegetable proteins with respect to the effective amount needed in the resin, the thermoset products created and their physical characteristics.

When a gelatinous dispersion of this resin is admixed with a dry, water-soluble, particulate material (e.g., the chloride salt of an alkali metal), shaped into an article and then heated to about 180° C., it creates throughout the article a polymerized, water-permeable, membrane-like matrix. Except for a susceptibility to sensible water, the thermally set product of such an admixture is strong, durable and indefinitely stable. Immersed in water, however, the particulate-contents of the article slowly dissolve and diffuse into the water, leaving a soft, porous structure that is easily rended and degraded. The effective amount of the resin required for this application is comparatively small; a very thick admixture (containing about 0.5 to 5.0% by dry weight of resin), employing farinaceous flour as the carbohydrate, is preferred in the manufacture of articles such as controlled-release pellets of agricultural chemicals, e.g., agglomerated potash fertilizer.

When admixed with substrates, such as fine particulate, where simple physical integrity is the objective, or applied to the surfaces of paper products to enhance strength and water-resistance, the amount of resin solids needed to achieve these features, while usually small, depends on parameters such as particle or fiber size, porosity and the dilution and manufacturing means used. An effective amount of resin solids for such light-duty products ranges from about 0.1 to 10% of the dry weight of the material to be treated, with surface treatments tending to require lesser amounts of solids in more dilute dispersions. To be effective in the manufacture of articles, such as particle board or composite materials, where greater structural strength or solidity is a requisite, a commensurately larger amount of a more viscous version of the resin is needed.

The invention resides in the discovery that ammoniated glucose-protein mixtures, when intensely heated, react to form insoluble polymers, and that unhydrolyzed glucoside containing raw materials are direct substituents for glucose in this reaction.

Prior Art

In contrast to the synthetic resins based on carbohydrate-protein mixtures disclosed in earlier patents and the applicable literature, the resin of the present invention:

a) Is capable of directly utilizing cellulosic materials as the carbohydrate component, as well as the sugar and starch feedstocks disclosed in the prior art;

b) Is created under ambient conditions immediately upon ammoniation of the carbohydrate-protein mixture;

d) Does not require the protracted high-temperature acid-hydrolysis pretreatment ordinarily required for conversion of polysaccharides to monomeric resin-forming reactants;

d) Reacts when heated to form a strong, insoluble, Maillard-type polymer without employing formaldehyde or hydrocarbons; and e) Is compatible with and effectively bonds to a very wide variety of substrates in addition to lignocellulosics, the lone functional use for which most prior art resins were developed.

The closest prior art, Viswanathan, et al, U.S. Pat. Nos. 4,524,164 & 4,692,478 and Viswanathan's article, Identification of Thermosetting Adhesive Resins From Whey Permeate As High Molecular Weight Maillard Polymers, pp.176–177, Ind. Eng. Chem. Prod. Res. Dev. Vol.24, 1985, which elucidates Viswanathan '164, is distinguished from this invention by the following comparison. Although both sugar and starch (but not cellulose) containing materials are described as suitable starting materials for both processes of Viswanathan, protein-containing whey permeate is, in each instance, reported to be the preferred starting material. In these processes the starting material is initially reacted at low pH and high temperature (acid-hydrolysis) to obtain polymerizable monomeric reactants; a costly and time-consuming preparatory step totally eliminated from the method of the present invention. When the acid-hydrolysis processes of Viswanathan, et al, are compared to the base-ammoniation method disclosed herein, not only is the distinctive nature of the present invention evident, it becomes clear that disparate precursors of Maillard-type polymers are obtainable from an identical starting material (permeate) by altogether different reaction-pathways.

The complexity of Maillard reactions and the products it creates is illustrated in the work reported by Aldo Ferretti, et al, in the Journal of Agricultural Food Chemistry, pp.13–18, vol.18, No.1, 1970, and pp.245–249, Vol.19, No.2, 1971, wherein a total of 80 volatile compounds, isolated and identified from model lactose-casein systems that had been conditioned eight days at 80° C., are enumerated. Inasmuch as Maillard reactions are known to occur at any temperature, require a low order of energy for initiation and exhibit autocatalytic properties once begun, the present invention is believed to be a manifestation of an initial, but irreversible, phase of a Maillard-type reaction.

An earlier, different approach to the use of carbohydrate-protein mixtures as adhesives is presented in the article Utilization of Whey/Lactose As An Industrial Binder, Journal of Agricultural Food Chemistry, pp.687–690, Vol.27, No.4, 1979, Arthur Ferretti, et al. It reports on the substitution of whey and lactose for molasses (the preferred carbohydrate) in U.S. Patent Nos. 3,567,811, 3,765,920 and 3,857,715 of Humphrey. These patents, and the adaptation described in the referenced article, do not have as an objective a product with weather resistance imparted by the carbohydrate binder. Rather, the function of the binder in each case, is to provide green strength during handling, drying or, as in portland cement products, natural hydration. Products made by the methods of the first two Humphrey patents require post-drying induration at drastically high temperatures (1000+° C.) before they acquire a permanent ceramic or oxide-type interparticle bond. Until bonding is effected, the particulate matter is merely held together by carmelized, but water-soluble, carbohydrate. Substitution of whey in Humphrey's processes does not utilize the potential contribution of the protein constituent and provides, therefore, only an economic benefit.

J. Mauron, in the article, The Maillard Reaction In Food, Progress In Food Nutrition Science, Vol.5, pp.5–35, Pergamon Press Ltd., 1981, Great Britain, states, "Only reducing sugars can take part in the Maillard reaction as they provide the necessary carbonyl groups . . . sucrose as non-reducing sugar should not participate in Maillard reactions as such but only after the hydrolysis of the glycosidic bond releasing the constituent monosaccharides." Moreover, numerous references show that hydrolyzed non-reducing sugars and starches are suitable starting materials for polymeric resins, but cellulose, the more strongly bound polysaccharide, is to be avoided in light of the engineering and economic difficulties its hydrolysis presents.

The Preferred Embodiment

The direct utilization of unhydrolyzed glucans, particularly cellulosics, in creating the resin disclosed herein is a significant advance over the prior art and, in that context, the ability to directly employ cellulose-containing materials is the exemplary or best mode of operation of the invention.

Comminuted lignocellulose (flour made from wood, straw or other botanical byproduct) is the polymer-forming equivalent of cellulose powder when its quantitative contribution to the resin is adjusted to reflect the amount of lignin and other non-glucan substances it contains. To clearly establish, however, that this expression of the resin does not depend for its efficacy on the presence of lignin, high purity (91–95%), nearly lignin-free (0.2% wt. lignin), cellulose was used in the fabrication of 2 quite distinct articles: A paper product with enhanced physical properties, and durably bonded agglomerates of fine particulate.

A general purpose supply of a non-optimized cellulose-based resin was prepared by ammoniating a mixture of 90 g. of nominally-dry cellulose powder (Cellulose Floc Div., James River Corp., product BW-300, 97% minus 200 mesh) and 10 g. of nominally-dry, defatted, fine-ground soy flour that had been dispersed in 200 ml of distilled water; ammoniation to pH 7+ required about 5 ml of 28% aqueous ammonia. (Except for the specific deviations noted therein, the foregoing procedure and proportions were used to prepare all the examples of Table 2, below, which summarizes the results of example evaluation.)

Paper product: One-half of the general purpose supply was diluted with 400 ml water, yielding a resin with a liquid:solids ratio of about 10:1, and used to treat thick (0.5 mm, 240 g/m$^2$), unsized blotter paper; the other half was reserved for bonding particulate agglomerates and had a ratio of about 2:1.

Two, 1×4 inch, strips of the blotter paper, were briefly dipped into the diluted resin to a depth of about 3 inches and then dried at about 90° C; one strip was subsequently exposed to a cure temperature of about 180° C. for about 2 minutes. After a 5 minute water-soak, no difference in water-resistance was detectable between the two sections of paper strip dried at low temperature; both readily dissociated when torn or stretched. After a similar soak, however, the treated portion of the strip heated to the cure temperature displayed a marked superiority in tensile strength, stiffness and tear resistance when compared with the adjoining untreated portion. Although this liquid:solids ratio provided an effective amount of the resins for treating this particular article, paper products with significantly different characteristics require modification of this ratio.

Bonded particulate: To achieve a dry-weight ratio of about 2 parts of this new resin (as a binder matrix) to 20 parts of fine silica sand (as a representative particulate), 60 g. of the reserved half of the resin was admixed with 200 g. of sand (100% minus 60 mesh), together with water sufficient to attain a shapeable consistency (typical range, 20 to 50% moisture). One-half inch diameter pellets agglomerated from this admixture were dried and then cured at 180° C. for 10 minutes. When evaluated for strength and water-resistance, this amount of resin proved effective as a binding agent for agglomerated sand; the quantity required for other kinds of particulate, or agglomerates with greater or lesser strength requirements, will vary with the specific material or desired product characteristics.

The Materials & Methods of the Examples (Refer to Tables 1 & 2)

The materials listed in Table 1 were utilized, either along (Examples in I, Dairy, Table 2) or in combination (Examples II to V), to illustrate the primary focus and limits of the present invention. Specifically, these examples display the range and assortment of glucose, glucoside and glucan containing materials that will form a thermoset polymer from an ammoniated mixture, which inherently contains, or has been augmented with, protein material. The potential utility of various candidate solid reactants in the formation of such polymers is shown in the right hand columns of Table 1. The demonstrated ability of certain combinations of materials to partially or completely form thermoset polymers, when prepared and processed under the stipulated conditions, is summarized in the right-hand columns of Table 2.

With the exception of four examples, I.a. & I.b. and II.a. & II.d., Table 2, all examples were prepared and processed according to the method described in the Preferred Embodiment, above. In 2 of the examples cited, the pH was below alkalinity (7) and in 3 examples the thermosetting temperature (about 180° C.) was not attained. In each of these examples where a mixture did not fully polymerize, the fault was with the method, not the reactive capacity of the materials. In examples II.g. & III.c., however, the materials of these mixtures do not form polymerizeable combinations; fructose sugar (II.g.) is not hydrolyzable to the requisite glucose, and a mixture of urea and cellulose when ammoniated does not form a thermosetting resin.

It should be understood that the examples and embodiments disclosed herein are presented for illustrative purposes only and that many other combinations of materials and articles that embody the resin will be suggested to persons skilled in the art and, therefore, the invention is to be given its broadest interpretation within the terms of the following claims.

TABLE 1

Properties & Utility of Reactants
(Used In Examples; Table 2)

| Reactant Material | resin (wt. %) | | Reactant Utility | | |
|---|---|---|---|---|---|
| | | | Carbo | Protein | Both |
| A. Carbo. + Protein | Protein | Lactose | | | |
| 1. Whey Permeate | 4.5 typ. | 93 typ. | x | x | x |
| 2. Delactose Perm. | 5.8 typ. | 74 typ. | x | x | x |
| B. Sugar | | Glucose | | | |
| 1. Lactose | | 46 | x | o | — |
| 2. Sucrose | | 46 | x | o | — |
| 3. Dextrose | | 94 | x | o | — |
| 4. Fructose | | 0 | o | o | — |
| 5. Glucose (Ca Lignosulfonate) | | 23 | x | o | — |
| C. Farinaceous | Protein | Starch | | | |
| 1. Defat. Corn Flour | 8.2 | 70.7 | x | sl. | + |
| 2. Corn Starch | — | 96 | x | o | — |
| 3. Potato Starch Flour | 1.2 | 86 | x | o | — |
| D. Cellulosic | | Cellulose | | | |
| 1. Cell. Powder (Solka-Floc) | | 91 min. | x | o | — |
| 2. Wood-Flour (Pine) | | 60 ave. | x | o | — |
| E. Proteinaceous | Protein | Carbohydrate | | | |
| 1. Whey Prot.Conc. | 34 min | 52 min. (Lactose) | x | x | x |
| 2. Defat. Soy Flour | 40–60 | 11–15 ave. | sl | x | + |
| 3. Soy Isolate | 93 min. | — | o | x | — |
| 4. Urea (Protein Equiv) | — | — | o | x | — |

(x) = Useful Reactant; (o) = No Reaction; (sl) = Slight Benefit
(+) = Slight Combined Effect; & (—) = Not Applicable.

TABLE 2

Examples - Results Summary
Paranthetical Terms, e.g. (X-O), Refer To Materials In Table 1

| Example & (Mat'l No.) | Combined With (Mat'l No.) | Cure T. °C. | pH NH3 | Polymerization | | |
|---|---|---|---|---|---|---|
| | | | | No | Partial | Total |
| I - Dairy | | | | | | |
| .a. Whey Permeate (A-1; only) | | 90 | 4 | x | | |
| .b. Whey permeate (A-1; only) | | 90 | 10+ | x | | |
| .c. Whey Permeate (A-1; only) | | 200 | 10+ | | | x |
| .d. Delact. Perm. (A-2; only) | | 200 | 9 | | | x |
| II - Soy Flour (E-2) | | | | | | |
| .a. W/Lactose (B-1) | | 180 | 6 | x | | |
| .b. W/Lactose (B-1) | | 180 | 9 | | | x |
| .c. W/Corn Flour (C-1) | | 180 | 8+ G* | | | x |
| .d. W/Corn Flour (C-1) | | 165 | 8+ G* | | x | |
| .e. W/Cellulose (D-1) | | 180 | 7+ | | | x |
| .f. W/Sucrose (B-2) | | 180 | 7+ | | | x |
| .g. W/Fructose (B-4) | | 180 | 7+ | x | | |
| .h. W/Wood Flour (D-2) | | 180 | 7+ | | | x |
| III - Urea (E-6) | | | | | | |
| .a. W/Lactose (B-1) | | 180 | 7+ | | | x |
| .b. W/Corn Starch (C-2) | | 180 | 7+ | | | x |
| .c. W/Cellulose (D-1) | | 180 | 7+ | x | | |
| .d. W/Glucose-Lig-Sul. (B-5) | | 180 | 7+ | | | x |
| IV - Whey Protein Concent. (E-1) | | | | | | |
| .a. W/Potato Starch (C-3) | | 180 | 7+ | | | x |
| V - Soy Isolate (E-5) | | | | | | |
| .a. W/Cellulose (D-1) | | 180 | 7+ | | | x |

Mixtures II–V prepared in ratio of about 1:20, i.e., Protein —E to Carbohydrate —A, B, C or D, respectively, as listed in Table 1.
G* - In pH column, denotes ammoniation with gaseous ammonia; all other examples ammoniated with a 28% aqueous solution.

I claim:

1. A thermosetting resin comprised of a mixture of a protein-containing material and a glucoside-containing material, which mixture has been ammoniated to alkalinity and wherein said protein-containing material is a soybean or pulse flour and said glucoside is selected from the group consisting of sucrose, starch and cellulose, or mixtures thereof.

2. A thermoset polymer comprised of a mixture of a protein-containing material and a glucoside-containing material wherein said protein-containing material is a soybean flour or a pulse flour and said glucoside-containing material is a comminuted lignocellulosic, or a mixture of comminuted lignocellulosics, which mixture has been ammoniated to alkalinity and heated to a temperature in the range of about 175° C. to about 260° C. for an interval of time sufficient to polymerize said ammoniated mixture and form said thermoset polymer.

3. A process for synthesizing a thermosetting resin which process comprises ammoniating to alkalinity a mixture of a protein-containing material and a carbohydrate-containing material, wherein said protein-containing material is a soybean or a pulse flour, or mixtures thereof, and said carbohydrate is selected from the group consisting of sucrose, starch and cellulose, or mixtures thereof.

4. The process of claim 3 wherein said carbohydrate-containing material is a comminuted lignocellulosic, or a mixture of comminuted lignocellulosics.

5. A process for preparing a thermoset polymer comprised of synthesizing a thermosetting resin in accordance with the process of claim 3 and heating said resin to a temperature in the range of about 175° C. to about 260° C. for an interval of time sufficient to polymerize said resin to said thermoset polymer.

6. The process of claim 3 wherein said ammonia is in the form of an aqueous solution, a gas, or anhydrous liquid.

7. A single step process for synthesizing a thermosetting resin from a mixture of a protein-containing material and a carbohydrate-containing material, wherein said mixture is selected from the group of nominally-dry mixtures consisting of whey, whey protein concentrate, whey permeate, delactosed whey permeate, or mixtures thereof, and mixtures wherein said carbohydrate is glucose, lactose, sucrose, starch, or cellulose, or mixtures thereof, and said protein-containing material is selected from the group consisting of soybean flour, pulse flour, whey, whey protein concentrate, whey permeate or delactosed whey permeate, or mixtures thereof said process comprising the step of treating said nominally-dry mixture with ammonia to the extent an alkaline pH is achieved.

8. A single step process for synthesizing a thermosetting resin from a mixture of a carbohydrate-containing material and a protein-containing material, wherein said carbohydrate is glucose, lactose, sucrose or starch, or mixtures thereof, and wherein said protein containing material is urea or a pulse flour, or mixtures thereof, said process comprising the step of treating said mixture with ammonia to the extent an alkaline pH is achieved.

9. A thermosetting resin synthesized by the single-step process of claim 8.

10. A process of improving the strength and water-resistance of a paper product comprising:
    a) treating said paper product with an effective amount of an aqueous dispersion of a thermosetting resin obtained by a process comprised of ammoniating a mixture of a protein-containing material and carbohydrate-containing material to alkalinity; and
    b) heating said paper product to a temperature in the range of about 175° C. to about 260° C. for an interval of time sufficient to thermoset said resin and thereby impart improved strength and water-resistance to said paper product.

11. A paper product with improved strength and water-resistance imparted by the process of claim 10.

12. The process of claim 10 wherein said protein-containing material is a soy bean flour, a pulse flour, urea, or mixtures thereof, and said carbohydrate is glucose, lactose, sucrose, or starch, or mixtures thereof.

13. The process of claim 10 wherein said protein-containing material is a soybean or pulse flour, or mixtures thereof, and said carbohydrate is glucose, lactose, sucrose, starch or cellulose, or mixtures thereof.

14. A process for preparing durably bonded agglomerates of particulate wherein said particulate is bonded in said agglomerates by a thermoset polymer, which process comprises:
    a) preparing a resin-particulate admixture by admixing with said particulate an effective amount of a thermosetting resin synthesized by a process comprised of ammoniating to alkalinity a mixture of a protein-containing material and a glucoside-containing material, wherein said protein-containing material is a soybean or a pulse flour and said glucoside is selected from the group consisting of sucrose, starch and cellulose, or mixtures thereof;
    b) adjusting the consistency of said resin-particulate admixture with water in an amount sufficient to attain a shapable resin-particulate admixture;
    c) employing a suitable means for agglomeration to form said shapable resin-particulate admixture into shaped agglomerates; and
    d) heating said shaped agglomerates to a temperature in the range of about 175° C. to about 260° C. for an interval of time sufficient to polymerize said resin to said thermoset polymer thereby durably bonding said particulate in said agglomerates.

15. Durably bonded agglomerates of particulate made by the process of claim 14.

16. Durably bonded fuel pellets made by the process of claim 14 wherein said particulate is coal-fines.

17. A process for preparing a water-permeable polymer-matrix which, on immersion in water, enables the dissolution, release and diffusion of water-soluble particulate material into said water from a shaped article in which said particulate material is, except for a susceptibility to sensible moisture, indefinitely stable and durably bonded by said polymer-matrix, and which polymer-matrix leaves, after dissolution, release and diffusion of said water-soluble particulate material into said water, a porous and degradable structure, which process comprises:
    a) preparing a resin-particulate admixture with a shapable consistency by admixing with said water-soluble particulate material an effective amount of an aqueous dispersion of a thermosetting resin, said resin being obtained by a process comprised of ammoniating to alkalinity a mixture of a protein-containing material and a carbohydrate-containing material; and
    b) employing a suitable means for article-shaping to form said shapable resin-particulate admixture into a shaped article; and
    c) heating said shaped article to a temperature of about 180° C. for an interval of time sufficient to thermally set said resin into said water-permeable polymer-matrix.

18. The process of claim 17 wherein said shaped article is a pellet and said particulate is a water-soluble agricultural chemical.

19. The process of claim 17 wherein said mixture of a protein-containing material and a carbohydrate-containing material is selected from the group of mixtures consisting of whey, whey protein concentrate, whey permeate, delactosed whey permeate, or mixtures thereof, and mixtures wherein said protein-containing material is whey, whey protein concentrate, whey permeate, delactosed whey permeate, a soybean flour or a pulse flour, or mixtures thereof, and said carbohydrate is glucose, lactose, sucrose, starch or cellulose, or mixtures thereof.

20. A product made by the process of claim 17.

* * * * *

UNITED STATES PATENT AND TRADEMARK OFFICE
CERTIFICATE OF CORRECTION

PATENT NO. : 5,371,194
DATED : December 6, 1994
INVENTOR(S) : Arthur Ferretti

It is certified that error appears in the above-indentified patent and that said Letters Patent is hereby corrected as shown below:

```
Column 1, line 62, change "said" to --sand--.
Column 2, line 15, change "extend" to --extent--.
Column 2 , line 19, before "10%" add --about--,
Column  3, line 27, change "glucan" to --glucoside--.
Column 4, line 15, change "d" to --c--.
Column 5, line 35, change "glucans" to --glucosides--,
          line 45, change "non-glucan" to
                   --non-glucoside--.
Column 6, line 17, change "resins" to --resin--,
          line 41, change "along" to --alone--,
          line 44, change "," to --and--,
Column 7, TABLE 1
Line 3, in the heading, "resin" should be --Resin--,
TABLE 2
Line 3, change "(X-0)" to --(A-1)--,
Line 4, delete "&",
Line 5, delete "(Mat'l No.)" first occurance,
line 24, underline "IV - Whey Protein Concent. (E-1)",
line 26, underline "V- Soy Isolate (E-5)",
In the Footnotes, change "-E" to --(E):-- and "A,B,C or D"
          to --(A,B,C or D)--.
```

UNITED STATES PATENT AND TRADEMARK OFFICE
CERTIFICATE OF CORRECTION

PATENT NO. : 5,371,194
DATED : December 6, 1994
INVENTOR(S) : Arthur Ferretti

It is certified that error appears in the above-indentified patent and that said Letters Patent is hereby corrected as shown below:

Claim 7
Column 9, line 31, change "or" to --and--,
        line 32, after "thereof," insert a --;--.
Claim 10
Column 9, line 45, change "of" to --for--,
        line 51, before "carbohydrate-containing"
            insert --a--.

Signed and Sealed this

Thirtieth Day of July, 1996

Attest:

BRUCE LEHMAN

Attesting Officer      Commissioner of Patents and Trademarks